Jan. 24, 1967  B. W. O. DICKINSON III  3,299,694
METHOD AND APPARATUS FOR DETECTING FLAWS
USING ULTRASONIC HELICAL WAVES
Filed March 25, 1963
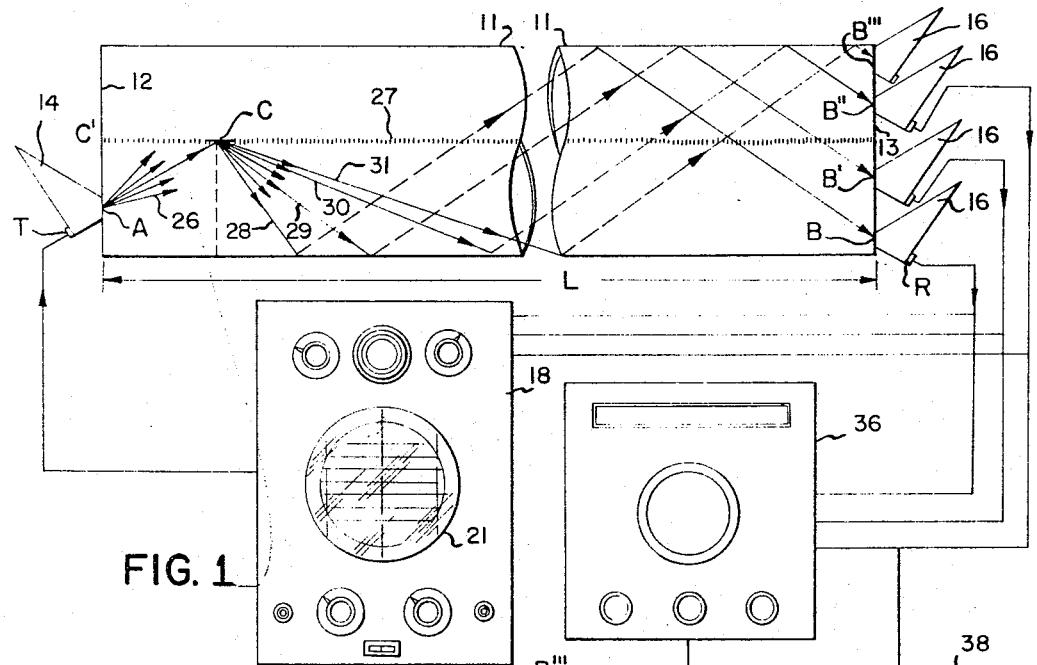
FIG. 1
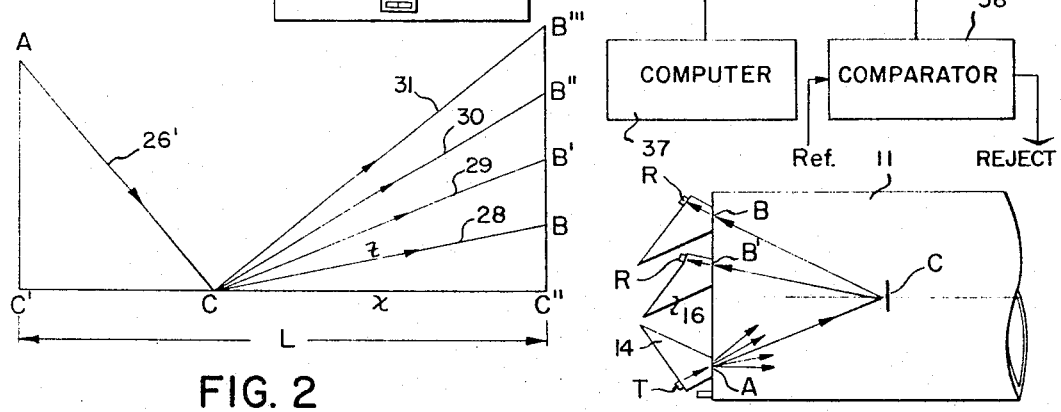
FIG. 2
FIG. 3
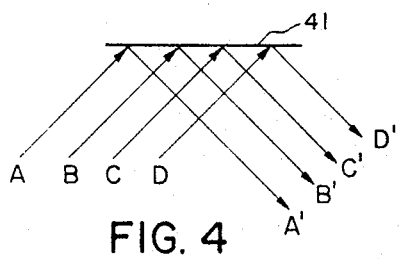
FIG. 4
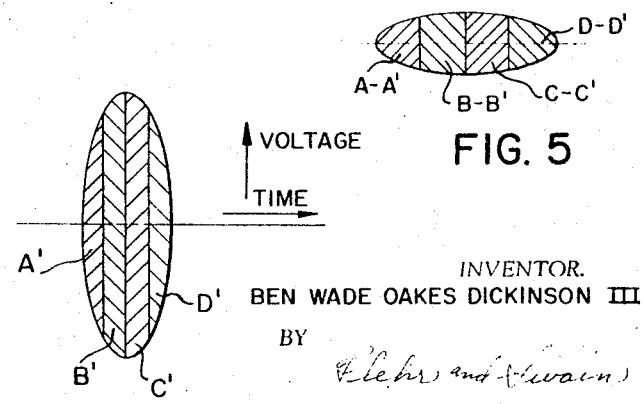
FIG. 5
FIG. 6
INVENTOR.
BEN WADE OAKES DICKINSON III
BY
ATTORNEYS

United States Patent Office 3,299,694
Patented Jan. 24, 1967

3,299,694
METHOD AND APPARATUS FOR DETECTING
FLAWS USING ULTRASONIC HELICAL WAVES
Ben Wade Oakes Dickinson III, 3290 Jackson St.,
San Francisco, Calif. 94118
Filed Mar. 26, 1963, Ser. No. 268,091
22 Claims. (Cl. 73—67.5)

This invention relates to a method and apparatus for detecting flaws using ultrasonic helical waves and more particularly to such a method and apparatus for use in detecting flaws in tubular objects.

In my copending application Serial No. 151,331, filed November 9, 1961, now Patent No. 3,186,216, there is disclosed a method and apparatus for generating and receiving ultrasonic helical waves. The method and apparatus therein disclosed can be utilized for detecting flaws. However, that method and apparatus requires that the time of travel between the introduction of the wave train into and the receipt of the wave train from the tubular member be measured. This unduly complicates the apparatus and the method, particularly for certain applications. There is, therefore, a need for a new and improved method and apparatus for determining flaw locations in tubular members.

In general, it is an object of the present invention to provide a method and apparatus for determining flaw locations in tubular members which is substantially independent of the length of the tubular member being tested.

Another object of the invention is to provide a method and apparatus of the above character in which the total elapsed time of travel need not be computed.

Another object of the invention is to provide a method and apparatus of the above character in which it is only necessary to measure the time difference or phase difference at constant frequency between different wave trains to determine the coordinates of a flaw.

Another object of the invention is to provide a method and apparatus of the above character in which flaws can be automatically located.

Another object of the invention is to provide a method and apparatus of the above character in which it is possible to determine the flaw size and configuration.

Additional objects and features of the invention will appear from the following description in which the preferred embodiments are set forth in conjunction with the accompanying drawings.

Referring to the drawings:

FIGURE 1 is a diagram with certain parts schematically illustrated of apparatus incorporating my invention.

FIGURE 2 is a representation of the triangles which are formed by the ultrasonic wave trains and which are utilized in determining the location of a flaw.

FIGURE 3 is a partial perspective view of another embodiment of my apparatus utilized for determining flaw locations in girth welds or flaws perpendicular to the longitudinal axis of the tubular member.

FIGURE 4 is a diagram showing a typical flaw with the transmitted and reflected ultrasonic wave trains.

FIGURE 5 is a view in cross-section of a typical flaw.

FIGURE 6 shows the pattern formed on an oscilloscope by the flaw shown in FIGURE 5.

In general, my method for determining flaw locations in a tubular member consists of introducing at least one helically directed ultrasonic wave train into the wall of the tubular member at an angle differing from the longitudinal axis of the tubular member. Portions of the ultrasonic wave train are reflected by a flaw in the tubular member to provide at least two reflected wave trains which also travel in helical paths. The reflected wave trains are received at different angular positions. The differential in time of travel or the differential in phase angle of fixed frequency of the reflected wave trains is measured. With this information, the coordinates of the flaw can be readily determined. If it is only necessary to determine the location of a flaw in a longitudinal weld in the tubular member and the wave train group velocity is known, the difference in time between only two received ultrasonic wave trains need be determined. If the flaw can be in any position in the tubular member and the wave train group velocity is known, the time difference between three different wave trains must be determined in order to obtain the coordinates of the flaw. This difference in time may be measured directly from the received pulses or a transform may be made of the received pulses and the phase angle differential of a selected frequency measured which in turn can be used in conjunction with that known frequency to yield a time differential between received pulses.

Apparatus for performing my method for determining flaw locations in tubular members is shown in FIGURE 1. The tubular member is in the form of a pipe 11 as, for example, a pipe having an outside diameter of 36 inches and a wall thickness of ½ inch. The pipe is provided with relatively smooth ends 12 and 13 which can be either squared or beveled.

At least one transmit wave director or a transducer offset 14 is mounted on or pressed into one end of the pipe and at least two receive wave directors or transducer offsets 16 are mounted on the other end of the pipe. As explained in my copending application Serial No. 151,331, filed November 9, 1961, now Patent No. 3,186,216, the offsets can be secured to the ends of the pipe in any suitable manner so long as an intimate contact is obtained between the offsets and the end walls of the pipe so that there is a good transfer of ultrasonic energy from the transmit offset 14 to the tubular member and from the tubular member to the receive offsets 16. As also described in my copending application, the offsets 14 and 16 have a particular configuration so that the ultrasonic wave trains introduced therein are introduced into the ends of the pipe wall in a direction of propagation away from the offset and generally in a direction longitudinally of the pipe but at an angle which differs from the longitudinal axis of the tubular member.

Transducers are mounted on each of the offsets 14 and 16 as indicated and are identified with the letters T and R to indicate transmit and receive transducers, respectively. The transducers T and R make intimate contact with the offsets or wave directors so that the ultrasonic wave trains produced by the transducers are introduced into the transmit offset 14 and then transmitted into the pipe wall. Ultrasonic wave trains are received by the receive offsets 16 and the receive transducer R. The transmit transducer T, such as a lead metaniobate disc manufactured by the General Electric Company or a Type Z transducer manufactured by Branson Instruments, Inc., is supplied with energy of a desired frequency from a suitable transmitting and pulsing apparatus 18, representative performance of which is a rise time of about .1 microsecond, a pulse height 500–2000 volts, a repetition rate 0–500 cycles, and a pulse width .1–.5 microsecond. Alternatively, an impulsive acoustic signal generator using explosives, electric arcs, or other devices such as is described in copending application Serial No. 245,862 dated December 19, 1962, may be used. A separate receive-display apparatus such as a Model 533A Tektronix oscilloscope supplied with a trigger signal from a suitable pulser and suitable preamplifiers and filters is used.

As pointed out in my copending application Serial No. 151,331, the area of contact between the offset 14 and the end wall of the pipe or tubular body 11 is sufficiently wide so that a substantially uncollimated angularly diverging group of ultrasonic wave trains enter the end of the pipe at point A as shown by the multiplicity of arrows 26 emanating from the transmitting offset 14. This contact is suitably shielded by slots in the wave director to minimize or eliminate undesirable diffraction effects and to provide any desired collimation as described in copending application Serial No. 268,204, filed March 26, 1963. These wave trains, as they emanate from the offset 14, propagate in a direction which is away from the transmit offset and follow a helical path around and longitudinally of the pipe toward the other end of the pipe. The ultrasonic wave train follows a helical path because from the point of view of the short wavelength helical ultrasonic wave train, the pipe represents a flat plane or wave guide of finite thickness and length but which is infinitely wide.

The ultrasonic wave trains actually travel in a helical path because they are introduced into the end walls of the pipe at an angle which is different from the longitudinal axis of the tubular body or pipe 11. By introducing these ultrasonic wave trains into the end or the side of the pipe, I am, in fact, insonating, i.e., filling a major portion of the walls of the pipe with ultrasonic wave trains from a single transmit transducer T and a single offset 14.

Now let it be assumed that an axially oriented flaw C is situated in the pipe wall and that it is located in the longitudinal weld 27 in the pipe. The ultrasonic wave trains 26 are reflected by the flaw C as reflected wave trains represented by the rays 28, 29, 30 and 31 will be reflected from the flaw at oblique angles which also travel longitudinally along the length of the pipe in helical paths. These reflected wave trains emerge from the other end of the pipe at points B, B', B'' and B''' and are received by the plurality of receive transducers R. The wave trains which are received by the receive transducers R are transformed into signals which are supplied to the display apparatus 18.

As explained in my copending application Serial No. 151,331, filed November 9, 1961, now Patent No. 3,186,216, substantially the entire length and the entire wall of the pipe 11 can be inspected with the use of the one transmit transducer T and the associated offset 14 because a large number of wave trains are formed which are angularly divergent as indicated by the rays 26 so that the wave trains cover substantially all portions of the wall of the pipe. To insonate those portions of the pipe near the transmit offset or wave director which are not suitably insonated by that single offset, either a second set of transmit-receive offsets and transducers may be provided which send wave trains from right to left—the opposite direction to that shown in FIGURE 1, or additional offsets and transducers can be added and appropriately spaced around the left end (the transmit end of the object or pipe as shown in FIGURE 1) and the transmit-receive functions of these offsets and transducers exchanged to provide, first, a left-to-right helical insonation and then a right-to-left helical insonation of the tubular object. If there is no flaw in the pipe, the ultrasonic wave trains travel in the same direction around and longitudinally of the pipe in a direction which is opposite-hand to the direction in which the reflected waves 28, 29, 30 and 31 travel. When the unreflected waves 26 arrive at the receiving transducer offsets 16, the unreflected waves enter the offsets in such a direction that they are selectively attenuated such as by bouncing progressively down the tapered or attenuating portion of each of the wave directors or offsets so that they become attenuated and, in effect, are lost. The method is not limited to the design of wave director shown in FIGURE 1 but may be used with any wave director which selectively attenuates the received unreflected wave train and does not affect the received reflected or flaw indicative wave train. With the offsets 16 oriented in the manner shown, the unreflected wave trains cannot excite the receive transducers R and, thus when there is no flaw in the pipe, no signals are supplied to the apparatus 18.

For reasons hereinafter explained, when it is desired to determine the location of any flaws in the longitudinal weld 27, only two receive transducers R are required if the wave train group velocity is known, whereas if the pipe is a seamless type and it is desired to find flaws in a circumferential location within the pipe, three receive transducers R are required if the wave train group velocity is known.

The path which is travelled by the ultrasonic wave train 26 is introduced into the pipe and the paths which are travelled by the reflected wave trains 28, 29, 30 and 31 are indicated in the diagram in FIGURE 2. These paths can be visualized by splitting the pipe and spreading it apart so that it is in the form of a flat plate. When flattened in this manner, the helical paths are transformed into straight line paths. As shown in FIGURE 2, the ultrasonic wave train 26 is introduced at A and follows a straight line path to point C which is the flaw. The ultrasonic wave train is reflected into four different wave trains which travel paths 28, 29, 30 and 31 as indicated to points B, B', B'' and B'''. It can be readily seen that the length of the paths from CB is different than the length of the path CB' or CB'' or CB''', and for that reason, the time of travel of the ultrasonic wave trains from point C to points B, B', B'' and B''' will be different.

In order to determine the location of a flaw with my method, it is only necessary to determine the difference in time for travel of the ultrasonic wave trains to points B, B', B'' and B''' by knowing the distance B to B', B'' to B''' and B'' to B''', it is possible to calculate the lengths of CC''', and BC'' which are the coordinates by triangulation of the flaw. An example of such a calculation for the general case where the wave train group velocity is not known, is set forth below. Referring to FIGURE 2, and using the following definitions:

$CC''' \equiv x$
$C''B \equiv y$
$CB \equiv z$
$BB^i \equiv \delta_i$
$c \equiv$ Velocity of Sound along $CB^i$
$T_i \equiv$ Difference in time of arrival of sound travelling along $CB$ and $CB^i$ where $B^i = B'$, $B''$, $B'''$, etc.

Then $x^2 + (y+\delta_i)^2 = (z+cT_i)^2$

Given $\delta_i$, $T_i$; find $x, y, z, c$.

$$x^2 + y^2 = z^2 \quad (1)$$
$$x^2 + (y+\delta_1)^2 = (z+cT_1)^2 \quad (2)$$
$$x^2 + (y+\delta_2)^2 = (z+cT_2)^2 \quad (3)$$
$$x^2 + (y+\delta_3)^2 = (z+cT_3)^2 \text{ etc.} \quad (4)$$
$$(2)-(1): 2y\delta_1 + \delta_1^2 = 2czT_1 + c^2T_1^2 \quad (5)$$
$$(3)-(1): 2y\delta_2 + \delta_2^2 = 2czT_2 + c^2T_2^2 \quad (6)$$

$\delta_1$ from Equation 6 — $\delta_1$ from Equation 5:

$$(\delta_1\delta_2 - \delta_1\delta_2{}^2) = 2cz(T_1\delta_2 - T_2\delta_1) + c^2(T_1{}^2\delta_2 - T_2{}^2\delta_1) \quad (7)$$

or $$(a_{12}) \equiv 2cz(b_{12}) + c^2(d_{12}) \quad (8)$$

where $a_{12} = \delta_1{}^2\delta_2 - \delta_1\delta_2{}^2$
$b_{12} = T_1\delta_2 - T_2\delta_1$ and $d_{12} = T_1{}^2\delta_2 - T_2{}^2\delta_1$ Similarly, form (4)−(1), as done in (5) and (6); call it (9). Then with $\delta_3(5)-\delta_1(9)$ form (10), similar to (7). This will be:

$$(\delta_1^2\delta_3-\delta_1\delta_3^2)=2cz(T_1\delta_3-T_3\delta_1)+c^2(T_1^2\delta_3-T_3^2\delta_1) \quad (10)$$

or $$(a_{13})=2cz(b_{13})+c^2(d_{13}) \quad (11)$$

Form $b_{12}(8)-b_{13}(11)$, getting $$a_{12}b_{13}-a_{13}b_{12}=c^2(b_{13}d_{12}-b_{12}d_{13}) \quad (12)$$

Whence $$c=[(a_{12}b_{13}-a_{13}b_{12})/(b_{13}d_{12}-b_{12}d_{13})]^{1/2} \quad (13)$$

From (8) $z=(a_{12}-c^2d_{12})/2cb_{12}$ (14)

This $z$ is obtained by substituting (13) into (14). From $$(5), \quad y=(2czT_1+c^2T_1^2-\delta_1^2)/2\delta_1 \quad (15)$$

Thus $y$ is obtained by substituting (14) into (15). Finally from (1)

$$x=\sqrt{z^2-y^2} \quad (16)$$

and $x$ is obtained by substituting (14) and (15) into (16). The expressions for $x$ and $y$ are long indeed, but are in terms of measured values only.

By making suitable approximations and transformations, these equations can be simplified for ready hand calculations or calculation by means of a suitable automatic computer.

Since the flaw testing will generally be done at a fixed frequency, the wave train group velocity associated with all of the multiple receive transducers is constant and can be measured for each frequency. Also, since it is possible to control or select the wave train frequency by variation of the matching circuitry of the transmit-receive transducers or by using different, suitable designed transducers, or by using suitable electronic filters, the group and/or phase velocity of the transmitted and receive signal can be varied as will $T_1$. Therefore, by using different frequencies it is possible to either set up a redundant or check set of calculations or eliminate one other variable while using the same transmit and receive offsets or wave directors and transducers. Thus, where there are a number of unknowns (the maximum is four—(1) the number of loops traveled by the ultrasonic wave train, (2) frequency or group velocity which is directly related to frequency, (3) circumferential position of the flaw and (4) longitudinal position of the flaw) the frequency can be varied to obtain sufficient simultaneous equations to solve for the unknowns rather than providing additional wave directors or offsets. In this way, additional reliability or simplicity of flaw location can be obtained.

Since common electronic pulse systems have intrinsic jitter and because of interference effects from local radio frequency signals, it may be necessary to provide correlation or linear filtering with respect to the initial transmit pulse or with respect to signals received by other transducers among the group of multiple transducers by a suitable computer apparatus.

The above calculations have been on the assumption that it was necessary to determine the axial location of the flaws as well as the circumferential location. If, as indicated in FIGURE 1, the circumferential location of the flaw is known as in a longitudinal weld, it is only necessary to determine the axial location. If the wave train group and/or phase velocity is known, to determine this axial coordinate, it is only necessary to provide two receive transducers because there are only two unknowns.

If the wave train group velocity is not known, it is necessary to provide three receive transducers because there are three unknowns. For the case where the flaw exists in a circumferential weld and the wave train group velocity is known, Equation 5 may be used to yield $z$ which can then be introduced into Equation 1 to yield:

$$x=\left[\left(\frac{2y\delta_1+\delta_1^2-c^2T_1^2}{2cT_1}\right)^2-y^2\right]^{1/2} \quad (17)$$

In most circumstances the term $c^2T_1^2$ is small compared to $2y\delta_1+\delta_1^2$ and can be neglected. For the case where the flaw exists in a circumferential weld and the group velocity is unknown, again assuming that $c^2T_1^2$ is dropped from Equation 17 by combining Equations 5 and 6 to yield $c$ which is then substituted in Equation 17

$$x=\left\{\frac{(2y+\delta_1)}{\left(\frac{4T_1}{T_1-T_2}\right)-\left[\frac{4\delta_2T_1^2(2y+\delta_2)}{\delta_1T_2(T_1-T_2)(2y+\delta_1)}\right]}-y^2\right\}^{1/2} \quad (18)$$

For computer purposes where $y$, $\delta_1$ and $\delta_2$ are known, and $T_1$ and $T_2$ are measured, Equation 18 simplifies to $$x=\left[\frac{\text{Const.}}{\theta\,(1-\text{Const.}\,\varphi)}-\text{Const.}\right]^{1/2}$$

where $$\theta\equiv\left(\frac{T_1}{T_1-T_2}\right)$$

and $$\varphi\equiv\frac{T_1}{T_2}$$

which is readily and easily computable.

Since wave train group velocity varies with frequency in a given constituent and thickness medium, by use of suitable filters and generation of wide band transmitted wave trains, the number of receive transducers and channels can be reduced by measuring time differentials at selected frequencies and, therefore, selected but different group velocities.

From the foregoing, it can be seen that with my method it is possible to determine the flaw location without measuring the length of each individual pipe or tubular member being tested. The length of the pipe is not a factor in determining the flaw location because with my method, it is only necessary to measure for the general case the differential in time of travel from point C to points B, B', B" and B'". My method is, therefore, independent of the length of pipe. In addition, with my method, it is unnecessary to measure the total time of travel from the point of introduction of the ultrasonic wave train at point A to time of receipt at points B, B', B" and B'". It is only necessary to measure the difference in time of travel from point C to points B, B', B" and B'" for the general case.

Although the transmitting, receiving and display apparatus 18 can be used for roughly locating such a flaw, it is desirable, in addition, to provide a suitable sampling dual or multiple trace oscilloscope 36, or electronic counter or time differential measurement device, which is provided with an analog to digital readout such as Tektronix Model No. 567 or Hewlett-Packard Counter Model 5234L which will give a digital readout directly in the difference in time between the various signals received. These time differences are then supplied to a suitable computer 37 which can be readily programmed to perform the algebra which is necessary to determine the coordinates of the flaw. Alternately, analog automatic computation techniques not involving analog to digital conversion of an oscilloscope are applicable.

For the alternate method of evaluating time differentials by utilizing phase angle differentials, suitable filters may be used following the receive transducers to produce a narrow bandwidth signal. This narrow bandwidth signal can then be transformed and/or analyzed or used in conjunction with similarly filtered signals from other receive channels to yield a phase angle differential between the receive signals from different channels. Since the frequency is selected and known, the phase angle differential can be combined with the frequency to yield the desired time differential.

For some automatic flaw location techniques, it is desirable to have the first received signal on each receive channel to be used as the basis of determining time differentials ($T_i$). With a combination of large pipe diameter and length it is possible that bounce signals differing by one integral loop can result; thus for some applications it is useful to place the axis of the transmit transducer on the pipe at an angle as small as 2°–15° with respect to the axis of the tubular member so as to assure that all received bounced wave trains have traversed less than one integral helical loop in their path CB, CB′ from the flaw to the receive transducer, etc., in FIGURES 1, 2. Also by using a small angle of introduction, the algebra can also be substantially simplified because if the number of integral loops traversed between reflection from a flaw and reception by a receive transducer is unknown, an additional unknown is introduced which requires and additional simultaneous equation and an additional receive transducer-offset to provide a solution.

In order to provide additional reliability in my method and apparatus, a plurality of transmit devices consisting of offsets or wave directors 14 and transducers T spaced circumferentially on one end of the pipe can be utilized which introduce ultrasonic wave trains into the wall of the pipe at relatively small angles. Similarly, a plurality of receive devices consisting of the receive transducer offsets 16 and the receive transducers R can be mounted on the other end of the pipe and can be utilized to determine flaws in an axial weld or flaws at any circumferential point in the pipe in a manner similar to that hereinbefore described. As previously described, utilizing the plurality of transmit transducers gives additional assurance that all portions of the wall of the pipe will be insonated and that any possible flaws in the pipe will be located.

From the foregoing, it can be seen that I have provided a method and apparatus which can be utilized for determining flaw location which is independent of the length of the pipe and which can give an automatic indication without any visual observation of an oscilloscope or any judgment on the part of the operator.

As shown in FIGURE 3, my method and apparatus can also be utilized for determining the location of flaws which are perpendicular to the axis of the pipe as, for example, flaws in a girth weld. As in the case of determining the location of axial flaws, at least one ultrasonic wave train is introduced into the wall of the pipe by the transmit transducer T through the offset 14. Ultrasonic wave trains will again be reflected by the flaw C to emerge from the pipe at B and B′ to a plurality of receive transducers R. When the flaw is located in a girth weld and the wave train group velocity is known, the axial coordinate is known and it is only necessary to determine the circumferential coordinate. When such is the case, only two receive transducers are required, as shown in FIGURE 3, to determine the unknown coordinate algebraically by means of the oscilloscope 36 and the computer 37. When the axial location is also unknown but the wave train group velocity is known, it is necessary to provide three receive transducers to determine both of the coordinates in much the same manner as hereinbefore described for determining the location of axial flaws described in connection with FIGURES 1 and 2.

It should be noted that in all of the foregoing the transmit and receive functions can be interchanged end for end because the paths and time differences remain the same. If the wave train group velocity in addition is unknown, four simultaneous equations are required for the four unknowns as are four receive transducer-offsets for this case. The techniques of varying insonation frequency and, in turn, wave train group velocity are equally applicable to the girth flaw case to provide redundancy or to simplify flaw location.

A fundamental problem of sound wave diffraction around the point of contact of the wave directors and the inspected object results from the use of wave directors with such small angles as 2°–15° with respect to the axis of the pipe. Such diffracted signals could be sufficiently deviated as to create a false flaw indication signal by rotating ray AC, FIGURE 1, around point A to a path of opposite helical rotational direction such as generally parallel to ray CB or CB′, etc. By proper placement of slots in the body of the wave directors 14, 16, it is possible to preclude creation of a diffracted signal at the point of contact of the wave director and the inspected object.

In observing the pulses which are received from different types of flaws in tubular objects, I have found that it is possible by analyzing the shape of the reflected pulse observed on the oscilloscope to determine the configuration of the flaw. For example, in considering an axial flaw 41 as shown in FIGURE 4 and assuming that a plurality of ultrasonic wave trains represented by the rays A, B, C and D strike the flaw at the incident angles indicated, ultrasonic wave trains will be reflected, represented by the reflected rays A′, B′, C′ and D′. Because each of these reflected rays is reflected from a different portion of the flaw, the times of travel of the different ultrasonic wave trains will be slightly different. Therefore, it can be seen that the length of the pulse which is received is complexly related to the length of the flaw. Also, I have found that the amount of ultrasonic energy which is reflected by a portion of the flaw is complexly related to the cross-section of the flaw. This reflected sound energy travels at a uniform rate through the pipe and is substantially uniformly attenuated by the pipe. Thus, the length of the signal and the strength of the signal produced by any one receive transducer R will be complexly related to the length of the flaw and the cross-section of the flaw. Differentiations of the detected pulse envelope will provide information on key discontinuities in the shape of the flaw and will also sharpen the displayed pulses.

A greatly enlarged cross-section of a typical flaw is shown in FIGURE 5 showing the portions of the flaw which receive the incident rays A, B, C and D and which reflect the reflected rays A′, B′, C′ and D′. The type of pulse which would appear on the oscilloscope created by such a flaw is indicated in FIGURE 6.

Another element of pulse characteristic interpretation is provided by making a Fourier transformation of the received signal into amplitude-frequency coordinates such as by a Panoramic Spectrum Analyzer Model SPA–3. The total energy reflected at each frequency from a flaw is displayed as the ordinate on such a spectrum analyzer. Thus the ordinate at each frequency is related to the total reflecting cross-section of the flaw.

With a combination of pulse width, pulse height and amplitude at each received frequency, a comparator 38 can be incorporated in my apparatus in FIGURE 1 which can be utilized to supply a reject signal to reject any piece of pipe in which either or all the pulse height, i.e., voltage, is greater than a predetermined voltage, the pulse length is greater than a predetermined length of time and the amplitude at each of several frequencies is greater than a predetermined value. Thus, with this type of apparatus, it is possible to provide a "go" "no-go" type of apparatus in which if a flaw of a certain size is found in a piece of pipe, the pipe is automatically rejected. The coordinates of the flaw can be determined at this same time so that the pipe can be repaired if desired.

It is apparent from the foregoing that I have provided a new and improved method and apparatus for detecting flaws using ultrasonic helical waves which is independent of the length of pipe and which can be utilized for determining flaws perpendicular to the axis of the tubular member as well as axial flaws. In addition, the size and shape of a detected flaw can be determined at the same time.

I claim:

1. In a method for investigating flaws in a member, introducing at least one ultrasonic wave train at a predetermined group velocity into the member, a portion of the wave train being deflected by a flaw to provide at least two deflected wave trains travelling in directions differing from the direction in which the ultrasonic wave train is introduced into the member, measuring the difference in time of travel of the two deflected wave trains to predetermined points, and determining at least one of the coordinates of the flaw utilizing said differences in time.

2. A method as in claim 1 together with the step of changing the group velocity to a different predetermined group velocity, and measuring the difference in time of travel of the reflected wave trains having said different group velocity to said predetermined points.

3. A method as in claim 1 together with the step of measuring the distance between the points at which the ultrasonic wave trains are received from the member.

4. A method as in claim 1 together with the step of determining the configuration of the flaw by measuring the duration and strength of the deflected wave trains.

5. A method as in claim 4 together with the steps of comparing the strength of the deflected wave train to a predetermined standard and creating a signal when the flaw exceeds a predetermined value.

6. In a method for investigating flaws in a member, introducing at least one ultrasonic wave train of a predetermined group velocity into the member, a portion of the wave train being deflected by a flaw in the member to provide at least two deflected ultrasonic wave trains travelling in directions differing from the direction in which the ultrasonic wave train is introduced into the member, receiving the deflected wave trains at two spaced points, measuring the difference in time of receipt of the received wave trains, measuring the distance between the points at which the wave trains are received, computing at least one of the coordinates locating the flaw from the measured time differences and the measured distances between the points at which the wave trains are received.

7. A method as in claim 6 together with the step of producing a signal from each of the received wave trains, the size of the signal being directly related to the size of the flaw, and producing an additional signal when the size of any one of the first named signals is greater than a predetermined size.

8. A method as in claim 6 wherein the member is tubular and the introduced and reflected wave trains enter and emerge from one end of the tubular member.

9. A method as in claim 6 together with the step of changing the group velocity to a different predetermined group velocity and measuring the difference in time of receipt of the wave trains of said different group velocity.

10. A method as in claim 6 wherein the member is tubular and the introduced wave train is introduced into one end of the tubular member and wherein the received wave trains emerge from the other end of the tubular member.

11. A method as in claim 6 wherein at least three deflected wave trains are received and wherein both of the coordinates of the flaw are computed.

12. In apparatus for investigating flaws in a member, means for introducing at least one ultrasonic wave train of a predetermined group velocity into the wall of the member, a portion of the wave train being deflected by a flaw in the member to provide at least two deflected ultrasonic wave trains travelling in directions differing from the direction of the ultrasonic wave train introduced into the member, means for measuring the difference in the time of travel of the deflected wave trains to predetermined points, and means for determining the location of the flaw utilizing the differences in time.

13. Apparatus as in claim 12 wherein said means for introducing the ultrasonic wave train includes at least one transmit transducer and wherein the means for receiving the ultrasonic wave trains includes at least two receive transducers.

14. Apparatus as in claim 12 wherein said means for introducing the wave train includes means for adjusting the group velocity of the wave train.

15. Apparatus as in claim 13 wherein the member being tested is tubular and the transmit and receive transducers are located on opposite ends of the tubular member.

16. Apparatus as in claim 13 wherein the member being tested is tubular and the transmit and receive transducers are located on the same end of the tubular member.

17. Apparatus as in claim 13 wherein the receive transducers generate a signal and wherein the size of the signal generated is directly related to the size of the flaw together with comparator means connected to the output of the receive transducers for generating a signal when the size of the signal produced by the receive transducers is greater than a predetermined size.

18. Apparatus as in claim 12 wherein the member is tubular and the wave train is introduced into the tubular member at an angle such that the deflected wave train travels through less than one complete loop before it is received by the receive transducer.

19. Apparatus as in claim 12 wherein the means for measuring the time difference includes means for measuring the time differences between at least three deflected wave trains and wherein the means for determining the flaw location includes means for determining both coordinates of the flaw.

20. In a method for investigating flaws in a tubular member, introducing at least one ultrasonic wave train of a predetermined group velocity into the wall of the tubular member at an angle differing from the longitudinal axis of the tubular member so that the wave train travels in a helical path in one direction in the wall of the tubular member, a portion of the wave train being reflected by a flaw in the tubular member to provide at least two deflected ultrasonic wave trains travelling in helical paths in a direction opposite in hand to the direction in which the ultrasonic wave train is introduced into the tubular member, receiving the deflected wave trains at two spaced points, measuring the difference in time of receipt of the received wave trains, and measuring the difference between the point at which the wave trains are received, changing the group velocity of the ultrasonic wave train introduced into the wall to a different predetermined velocity, and measuring the difference in time of receipt of the reflected wave trains of said different group velocity at said spaced points.

21. A method as in claim 1 in which the introduced wave trains are in the form of repeated pulses composed of a wide band of frequencies, and further including the step of performing a spectral analysis of the received wave trains by transforming them into amplitude frequency coordinates to determine whether the flaw characteristics are such as to warrant determination of at least one of its coordinates.

22. In a method for investigating flaws in a member, the steps comprising introducing ultrasonic wave train-pulses composed of a wide band of frequencies into a member at a predetermined location thereon, a portion of the wave train pulses being deflected by a flaw in the member to provide deflected wave trains travelling in paths having directions differing from the direction in which the ultrasonic wave train was introduced into the member, receiving deflected wave trains at a plurality of predetermined locations on the member, the locations being spaced from each other and from the location of introduction of wave trains, and performing a spectral analysis of the received wave trains by transforming them into amplitude frequency coordinates to determine whether the flaw characteristics are such as to warrant further investigation.

References Cited by the Examiner

UNITED STATES PATENTS

| | | | |
|---|---|---|---|
| 2,535,255 | 12/1950 | Barnes et al. | |
| 2,848,891 | 8/1958 | Hunter et al. | 73—67.5 |
| 2,932,189 | 4/1960 | Carlin | 73—67.7 |
| 3,041,872 | 7/1962 | Brown et al. | 73—67.9 |

FOREIGN PATENTS 23,083   4/1962   Germany.

OTHER REFERENCES

Nondestructive Testing Handbook, Robert C. McMaster, Ronald, 1959, sec. 45, pages 22–27.

RICHARD C. QUEISSER, *Primary Examiner.*

JOHN P. BEAUCHAMP, *Assistant Examiners.*